United States Patent
Ichinose (10) Patent No.: US 12,075,022 B2
(45) Date of Patent: Aug. 27, 2024

(54) IMAGE PROCESSING DEVICE AND IMAGE PROCESSING METHOD

(71) Applicant: SONY GROUP CORPORATION, Tokyo (JP)

(72) Inventor: Tsutomu Ichinose, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 98 days.

(21) Appl. No.: 17/757,083

(22) PCT Filed: Nov. 2, 2020

(86) PCT No.: PCT/JP2020/041021
§ 371 (c)(1),
(2) Date: Jun. 9, 2022

(87) PCT Pub. No.: WO2021/124709
PCT Pub. Date: Jun. 24, 2021

(65) Prior Publication Data
US 2023/0007230 A1   Jan. 5, 2023

(30) Foreign Application Priority Data

Dec. 19, 2019 (JP) ................................ 2019-228788

(51) Int. Cl.
*H04N 13/366* (2018.01)
*G06V 10/143* (2022.01)
(Continued)

(52) U.S. Cl.
CPC ......... *H04N 13/366* (2018.05); *G06V 10/143* (2022.01); *G06V 10/761* (2022.01);
(Continued)

(58) Field of Classification Search
None
See application file for complete search history.

(56) References Cited

U.S. PATENT DOCUMENTS

2012/0062456 A1   3/2012   Munekata
2013/0063564 A1   3/2013   Saijo et al.
(Continued)

FOREIGN PATENT DOCUMENTS

CN   102402283 A   4/2012
CN   103179412 A   6/2013
(Continued)

OTHER PUBLICATIONS

Jean-Yves Bouguet, "Pyramidal Implementation of the Lucas Kanade Feature Tracker Description of the algorithm", Intel Corporation, Microprocessor Research Labs, 2000, 09 pages.
(Continued)

*Primary Examiner* — Samuel D Fereja
(74) *Attorney, Agent, or Firm* — CHIP LAW GROUP (57) ABSTRACT

An image processing device includes: a light emitting unit that emits a near-infrared ray to a target; a light emission controlling unit that controls a light emission amount of the light emitting unit on a basis of a distance value between the target and the light emitting unit; and a detecting unit that detects a feature point on the basis of a captured image of the target irradiated with the near-infrared ray.

7 Claims, 8 Drawing Sheets

(51) Int. Cl.
*G06V 10/74* (2022.01)
*G06V 40/16* (2022.01)
*G06V 40/18* (2022.01)

(52) U.S. Cl.
CPC .......... *G06V 40/171* (2022.01); *G06V 40/193* (2022.01); *G06T 2207/10048* (2013.01); *G06V 2201/07* (2022.01)

(56) References Cited

U.S. PATENT DOCUMENTS

| | | | |
|---|---|---|---|
| 2014/0285641 A1 | 9/2014 | Kato et al. | |
| 2015/0186737 A1* | 7/2015 | Omi | H04N 23/61 348/77 |
| 2017/0068315 A1* | 3/2017 | Kang | G06V 40/193 |
| 2018/0012372 A1* | 1/2018 | Takao | G01S 17/46 |
| 2022/0294965 A1* | 9/2022 | Tsukada | G06T 7/90 |

FOREIGN PATENT DOCUMENTS

| | | |
|---|---|---|
| CN | 106504271 A | 3/2017 |
| EP | 3139303 A1 | 3/2017 |
| JP | 2004-195141 A | 7/2004 |
| JP | 2005-323180 A | 11/2005 |
| JP | 2012-063824 A | 3/2012 |
| JP | 2013-062560 A | 4/2013 |
| JP | 2017-054503 A | 3/2017 |
| KR | 10-2017-0029166 A | 3/2017 |
| WO | 2014/057618 A1 | 4/2014 |

OTHER PUBLICATIONS

International Search Report and Written Opinion of PCT Application No. PCT/JP2020/041021, issued on Jan. 19, 2021, 09 pages of ISRWO.

* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/041021 filed on Nov. 2, 2020, which claims priority benefit of Japanese Patent Application No. JP 2019-228788 filed in the Japan Patent Office on Dec. 19, 2019. Each of the above-referenced applications is hereby incorporated herein by reference in its entirety.

FIELD

The present invention relates to an image processing device, an image processing method, and an image processing program.

BACKGROUND

Various types of technology for displaying a stereoscopic image on a display have been proposed. Among them, proposals have also been made regarding naked-eye stereoscopic display that does not use any tools such as glasses. For example, as displays related to naked-eye stereoscopic display, light field displays represented by a lenticular method are known.

In a case where a stereoscopic image is displayed on a light field display, viewpoint positions on the right and left of a user are each detected, optimal light beams are collected at the viewpoint positions, and an image for the right eye and an image for the left eye are generated. For example, as technology for detecting a viewpoint position, Patent Literature 1 describes detecting a feature point of an image and tracking the feature point as a line-of-sight position.

CITATION LIST

Patent Literature

Patent Literature 1: JP 2004-195141 A

Non Patent Literature

Non Patent Literature 1: Jean-Yves Bouguet "Pyramidal Implementation of the Lucas Kanade Feature Tracker Description of the algorithm" Intel Corporation Microprocessor Research Labs (2000) OpenCV Documents

SUMMARY

Technical Problem

However, in the above-described conventional technology, there is room for improvement in processing of tracking a viewpoint position of a user.

Therefore, the present disclosure provides an image processing device, an image processing method, and an image processing program capable of appropriately tracking a viewpoint position of a user.

Solution to Problem

To solve the problems described above, an image processing device according to an embodiment of the present disclosure includes: a light emitting unit that emits a near-infrared ray to a target; a light emission controlling unit that controls a light emission amount of the light emitting unit on a basis of a distance value between the target and the light emitting unit; and a detecting unit that detects a feature point on a basis of a captured image of the target irradiated with the near-infrared ray.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

In addition, the present disclosure will be described in the following order of items.

1. Embodiments
   1.1 Exemplary External Appearance of Information Processing Device
   1.2 System Configuration Example of Information Processing Device
   1.3 Configuration Example of Tracking Device
   1.4 Processing Procedure of Tracking Device
   1.5 Effects of Tracking Device
2. Hardware Configuration
3. Conclusion

1. Embodiments

1.1 Exemplary External Appearance of Information Processing Device

Figure 1:
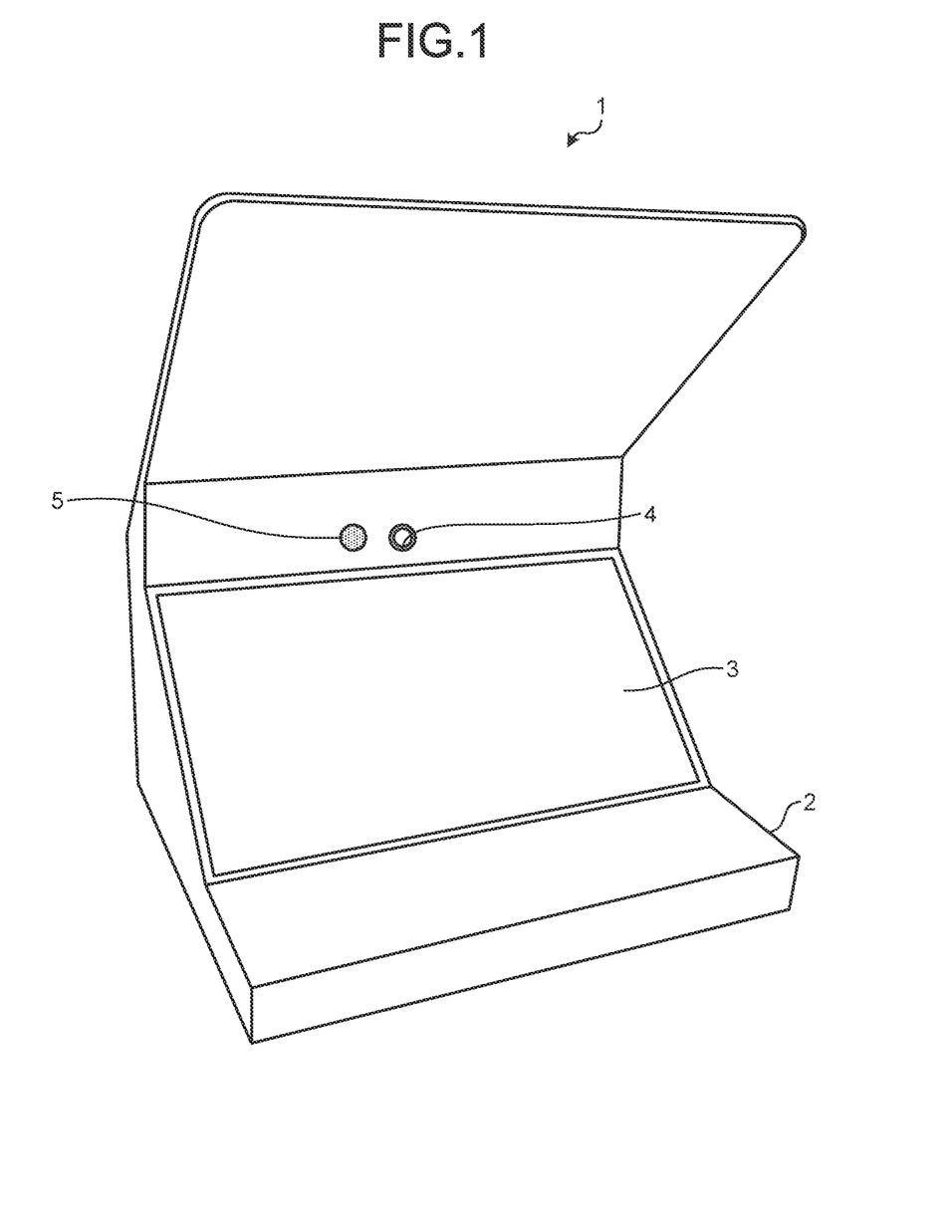
FIG. 1 is a diagram illustrating an exemplary external appearance of an information processing device according to the present embodiment.

FIG. 1 is a diagram illustrating an exemplary external appearance of an information processing device 1 according to the present embodiment. For example, the information processing device 1 has a size similar to that of a laptop personal computer; however, it is possible to further downsized or upsized.

The information processing device 1 includes a base 2 and a display 3 erected upward from the base 2. The information processing device 1 includes a camera 4 above the display 3 and is configured so as to be able to capture an image of a user located in front of the display 3 by the camera 4.

Furthermore, in the information processing device 1, a near-infrared ray emitting device 5 that emits a near-infrared ray to the user is disposed.

For example, the information processing device 1 can display a stereoscopic image by the lenticular method on the display 3. Schematically, the viewpoint positions of the user with naked eyes, who are not using glasses for stereoscopic display or the like, are detected using an image captured by the camera 4. Images for the right eye and the left eye (parallax images) are generated by light beams condensed at the respective left and right viewpoint positions, and the generated images are displayed on the display 3 on which a lenticular lens is mounted. As a result, the user can view the stereoscopic image without using glasses, a head up display (HUD), or the like.

1.2 System Configuration Example of Information Processing Device

Figure 2:
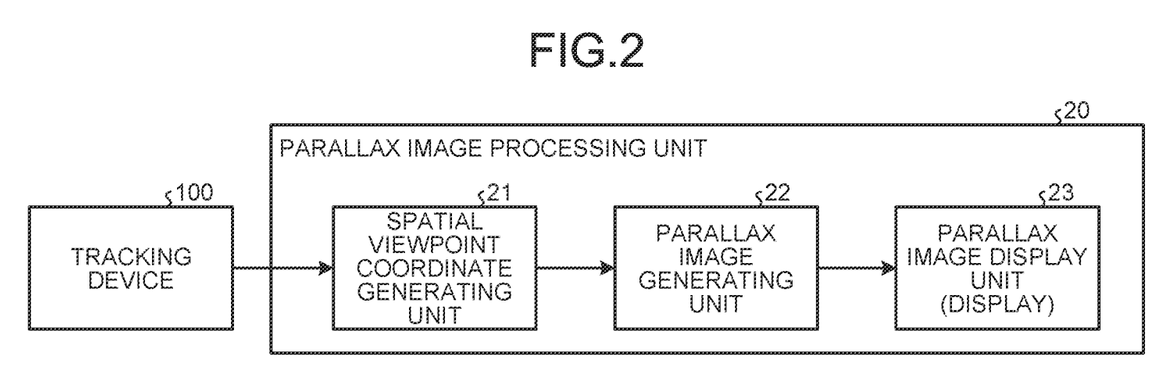
FIG. 2 is a block diagram illustrating a system configuration example of the information processing device according to the present embodiment.

FIG. 2 is a block diagram illustrating a system configuration example of the information processing device 1 according to the present embodiment. The information processing device 1 schematically includes a tracking device 100 and a parallax image processing unit 20. The tracking device 100 outputs information indicating the viewpoint positions of the user, for example, two-dimensional coordinates of the viewpoint positions, to the parallax image processing unit 20 as the subsequent stage. Note that details of the configuration, operation examples, and the like of the tracking device 100 will be described later. The tracking device 100 is an example of the "image processing device".

The parallax image processing unit 20 includes a spatial viewpoint coordinate generating unit 21, a parallax image generating unit 22, and a parallax image display unit 23. The spatial viewpoint coordinate generating unit 21 converts the two-dimensional coordinates indicating the viewpoint positions output from the tracking device 100 into viewpoint coordinates at spatial positions by applying a known method and generates viewpoint coordinates in a space. The parallax image generating unit 22 generates a stereoscopic image by generating light beams (images) corresponding to the viewpoint coordinates in the space. The parallax image display unit 23 is a device that presents a stereoscopic image by continuously displaying parallax images generated by the parallax image generating unit 22 and corresponds to the display 3 described above.

1.3 Configuration Example of Tracking Device

Figure 3:
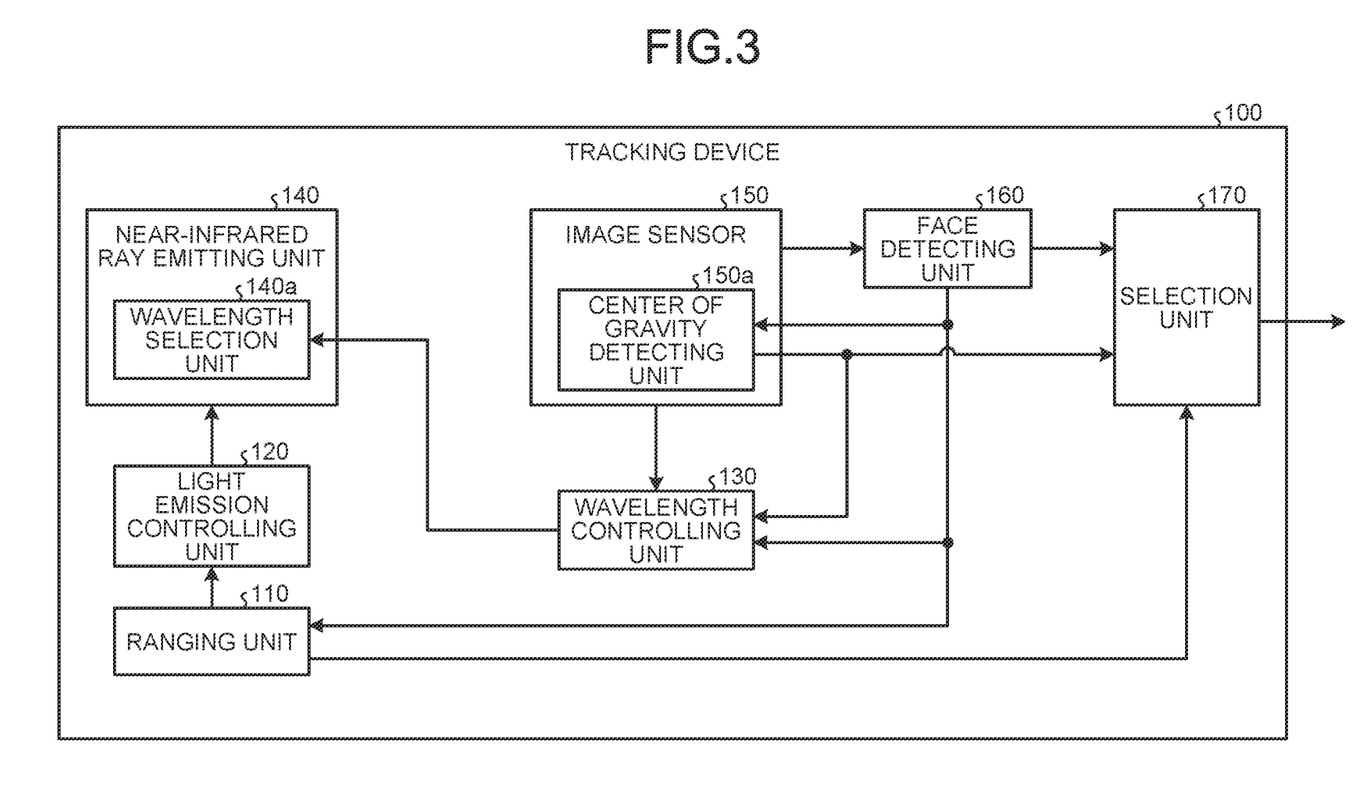
FIG. 3 is a block diagram illustrating a configuration example of a tracking device according to the present embodiment.

FIG. 3 is a block diagram illustrating a configuration example of the tracking device according to the present embodiment. As illustrated in FIG. 3, the tracking device 100 includes a ranging unit 110, a light emission controlling unit 120, a wavelength controlling unit 130, a near-infrared ray emitting unit 140, a wavelength selection unit 140*a*, an image sensor 150, a center of gravity detecting unit 150*a*, a face detecting unit 160, and a selection unit 170. Although not illustrated, it is based on the premise that the user is located in front of the near-infrared ray emitting unit 140.

In the example illustrated in FIG. 3, an example in which the ranging unit 110, the light emission controlling unit 120, the wavelength controlling unit 130, the near-infrared ray emitting unit 140, the wavelength selection unit 140*a*, the image sensor 150, the center of gravity detecting unit 150*a*, the face detecting unit 160, and the selection unit 170 are included in the tracking device 100 is illustrated; however, it is not limited thereto. For example, the ranging unit 110, the light emission controlling unit 120, and the near-infrared ray emitting unit 140 may be included in another unit.

The ranging unit 110 is a processing unit that calculates a distance value between the near-infrared ray emitting unit 140 and a target (user). The ranging unit 110 outputs the distance value to the light emission controlling unit 120.

For example, the ranging unit 110 calculates the distance value on the basis of the face detection result of the face detecting unit 160. The face detection result includes coordinates of the user's left eye and coordinates of the user's right eye. The distance between the coordinates of the left eye and the coordinates of the right eye is referred to as an "interocular distance". The ranging unit 110 calculates the distance value using a conversion table that defines the relationship between the interocular distance and the distance value. It is based on the premise that the relationship between the interocular distance and the distance value is set by calibration in advance.

The light emission controlling unit 120 is a processing unit that controls the light emission amount of the near-infrared ray emitting unit 140 on the basis of the distance value. The light emission controlling unit 120 specifies the magnitude of the current depending on the distance value and outputs a current (or voltage) of the specified magnitude to the near-infrared ray emitting unit 140.

Figure 4:
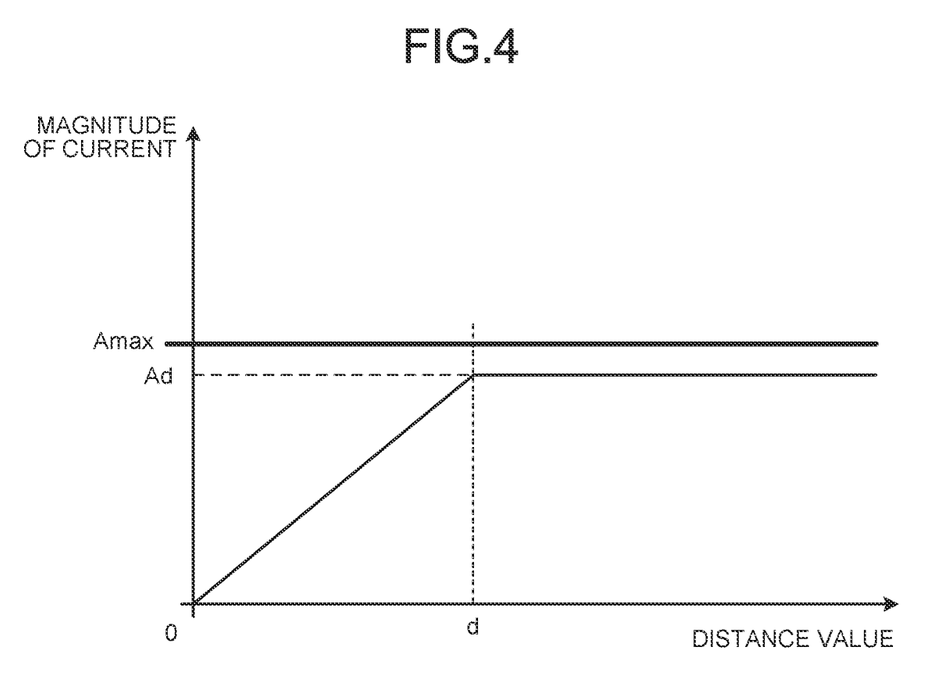
FIG. 4 is a diagram illustrating an example of current specifying information.

The light emission controlling unit 120 specifies the magnitude of the current depending on the distance value using current specifying information that defines the relationship between the distance value and the magnitude of the current. FIG. 4 is a diagram illustrating an example of current specifying information. Here, the current specifying information is illustrated by a two-axis graph. The vertical axis corresponds to the magnitude of the current, and the horizontal axis corresponds to the distance value. Amax denotes an upper limit value of the current. Amax satisfies the photobiological safety standards JIS C 7550 and IEC62471. That is, the user is safe when the near-infrared ray emitting unit 140 emits a near-infrared ray by a current having a magnitude less than Amax. For example, it can be said that the light emission controlling unit 120 specifies the magnitude of the current depending on the distance value by following the current specifying information in FIG. 4 and, in a case where the magnitude of the current is larger than the threshold value (Amax), corrects the specified magnitude of the current to a magnitude less than the threshold value.

As illustrated in FIG. 4, according to the current definition information, as the distance value increases (the distance between the user and the near-infrared ray emitting unit 140 increases), the magnitude of the current increases. When the distance value exceeds d, the magnitude of the current is Ad. The current value Ad is a value less than the current value Amax and is set in advance.

The wavelength controlling unit 130 is a processing unit that controls the wavelength of the near-infrared ray emitted by the near-infrared ray emitting unit 140. For example, the wavelength controlling unit 130 selects a wavelength on the basis of a face detection result of the face detecting unit 160, a detection result of the center of gravity of the center of gravity detecting unit 150*a*, and a captured image output from the image sensor 150. First, the wavelength controlling unit 130 generates a binarized image by binarizing a captured image. As a result, pixels in dark portions of the captured image become "1", and pixels in bright portions become "0".

The wavelength controlling unit 130 sets a partial region on the binary image on the basis of the face detection result of the face detecting unit 160 and the detection result of the center of gravity of the center of gravity detecting unit 150a. It is based on the premise that the partial region includes at least both eyes of the user. The wavelength controlling unit 130 calculates a ratio of pixels having a value of "1" (pixels in dark portions) to all the pixels included in the partial region. In a case where the ratio of pixels having a value of "1" is greater than or equal to a predetermined ratio, the wavelength controlling unit 130 selects such a wavelength that allows the ratio of pixels having a value of "1" to be less than the predetermined ratio.

For example, there is a plurality of wavelength selection candidates. It is based on the premise that the wavelength of a selection candidate is included in the range of wavelengths of near infrared rays (0.75 to 1.4 μm). The wavelength controlling unit 130 selects one of the selection candidate wavelengths and outputs the selection result to the wavelength selection unit 140a of the near-infrared ray emitting unit 140.

Meanwhile, the wavelength controlling unit 130 may select a wavelength on the basis of a table in which the features of the user and selection candidates are associated with each other. The features of the user corresponds to the race of the user, the color of the eyes, and the like. It is based on the premise that information regarding the features of the user is specified in advance by an input device (not illustrated) or the like.

The near-infrared ray emitting unit 140 is a device that emits a near-infrared ray to the user. The near-infrared ray emitting unit 140 corresponds to the near-infrared ray emitting device 5 described in FIG. 1. The wavelength of the near-infrared ray emitted by the near-infrared ray emitting unit 140 is switched by the wavelength selection unit 140a.

The emission intensity of the near-infrared ray emitted by the near-infrared ray emitting unit 140 depends on the magnitude of the current (voltage) output from the light emission controlling unit 120. That is, the emission intensity of the near-infrared ray emitted by the near-infrared ray emitting unit 140 increases as the current increases.

The wavelength selection unit 140a is a processing unit that switches the wavelength of the near-infrared ray emitted by the near-infrared ray emitting unit 140 on the basis of the selection result of the wavelength output from the wavelength controlling unit 130.

The image sensor 150 is, for example, a complementary metal oxide semiconductor (CMOS) sensor. As the image sensor 150, other sensors such as a charge coupled device (CCD) may be applied. The image sensor 150 captures an image of the user located in front of the display 3, more specifically, the region around the face of the user and acquires the captured image. The captured image acquired by the image sensor 150 is analog-to-digital (A/D) converted and then output.

Although not illustrated, an A/D converter or the like may be mounted on the image sensor 150 or may be provided between the image sensor 150 and the face detecting unit 160. Note that the image sensor 150 according to the embodiment is configured so as to be capable of high-frame-rate imaging. As an example, the image sensor 150 can capture images at greater than or equal to 1000 frames per second (fps). In the embodiment, description is given on the premise that the image sensor 150 can capture images at 1000 fps.

Here, the captured image includes a captured image in the IR band and a captured image of visible light. In the following description, a captured image in the IR band is referred to as an "IR captured image". A captured image of visible light is referred to as a "visible light captured image".

Figure 5:
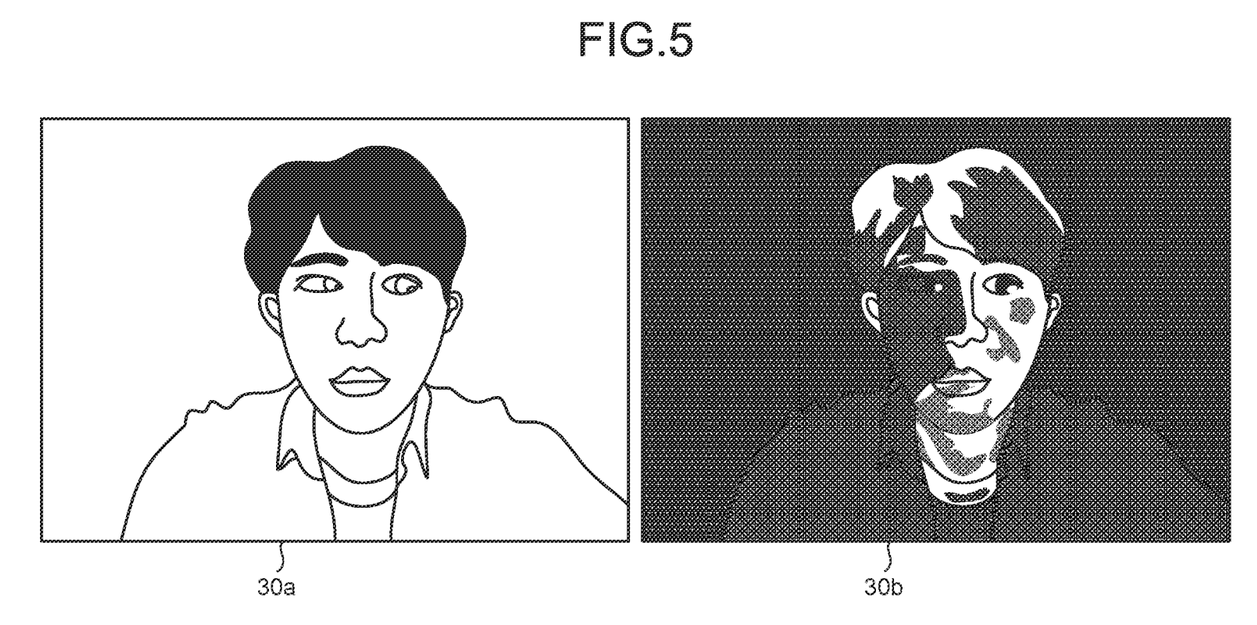
FIG. 5 is a diagram for explaining a captured image according to the present embodiment.

FIG. 5 is a diagram for explaining a captured image according to the present embodiment. In the example illustrated in FIG. 5, the visible light captured image is a visible light captured image 30a. The IR captured image is an IR captured image 30b.

The face detecting unit 160 performs face detection on the basis of the captured image (visible light captured image) acquired by the image sensor 150 and detects the user's face frame, coordinates of the left eye, and coordinates of the right eye. The face detecting unit 160 outputs the face detection result to the ranging unit 110, the center of gravity detecting unit 150a, and the selection unit 170. As a method for detecting a face (face frame, coordinates of the left eye, and coordinates of the right eye) by the face detecting unit 160, a known method, such as a method performed using features of an image, can be applied.

If the distance between the user and the image sensor 150 is too long, the face detecting unit 160 may not be able to detect the left eye or the right eye from the captured image. In a case where the detection of the left eye or the right eye has failed, the face detecting unit 160 outputs information of the face frame to the ranging unit 110, the center of gravity detecting unit 150a, and the selection unit 170 as a face detection result.

Note that the image sensor 150 includes the center of gravity detecting unit 150a. The center of gravity detecting unit 150a is a processing unit that detects a gravity center point of the pupil or the iris in the face frame on the basis of the face detection result output from the face detecting unit 160. For example, the center of gravity detecting unit 150a specifies the position of the pupil or the iris on the captured image (IR captured image) using the face detection result as a clue and calculates the position of the center of gravity of the pupil or the iris of the left eye and the right eye. The center of gravity detecting unit 150a outputs the detection result of the center of gravity to the wavelength controlling unit 130 and the selection unit 170. Note that the center of gravity detecting unit 150a may be located outside the image sensor 150.

The selection unit 170 is a processing unit that selects one of the face detection result and the detection result of the center of gravity on the basis of the distance value output from the ranging unit 110. For example, in a case where the distance value is greater than or equal to the threshold value, the selection unit 170 selects the face detection result. The selection unit 170 outputs the coordinates of the left eye and the coordinates of the right eye included in the face detection result to the parallax image processing unit 20 as viewpoint position information.

On the other hand, in a case where the distance value is less than the threshold value, the selection unit 170 selects the detection result of the center of gravity. The selection unit 170 outputs information regarding the gravity center points (the gravity center points of the pupils or the irises) to the parallax image processing unit 20 as viewpoint position information.

Figure 6:
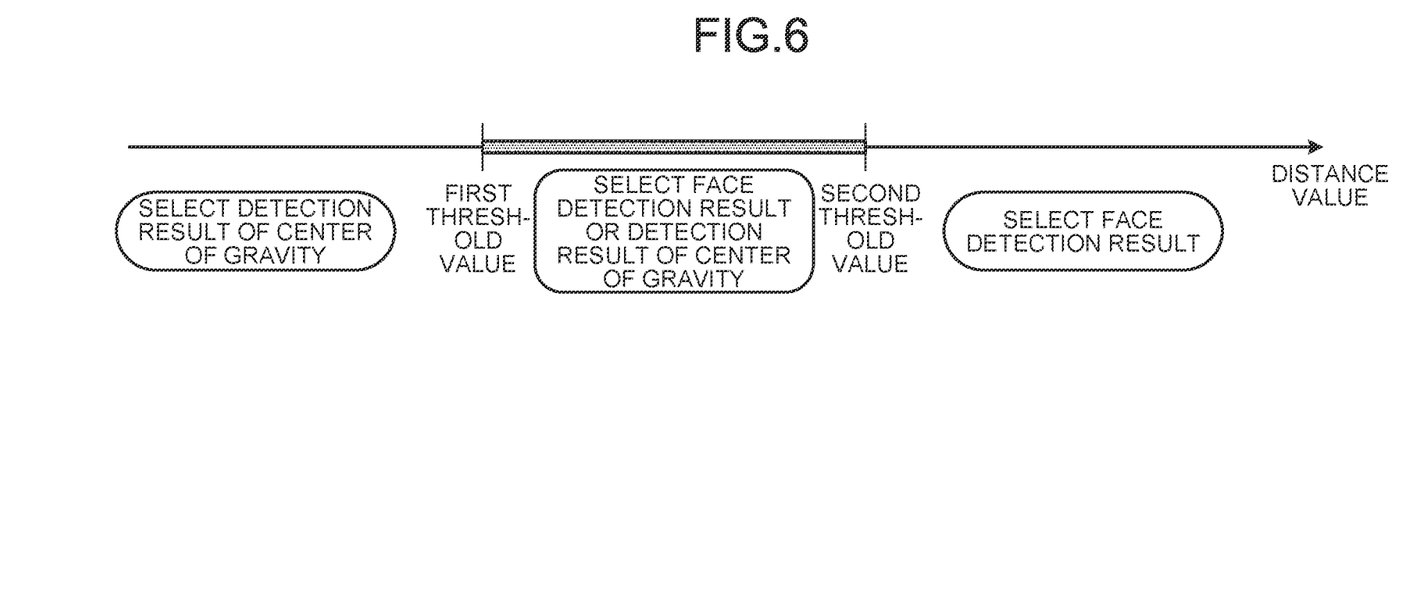
FIG. 6 is a diagram for explaining other processing of a selection unit according to the embodiment.

Meanwhile, the selection unit 170 may set a first threshold value and a second threshold value and select either the face detection result or the detection result of the center of gravity. FIG. 6 is a diagram for explaining other processing of the selection unit 170 according to the embodiment. The axis illustrated in FIG. 6 corresponds to the distance value. It is based on the premise that the first threshold value and the second threshold value are set on the axis corresponding to the distance value and that the first threshold value is smaller than the second threshold value.

In a case where the distance value acquired from the ranging unit 110 is less than the first threshold value, the selection unit 170 selects the detection result of the center of gravity. In a case where the distance value acquired from the ranging unit 110 is greater than or equal to the second threshold value, the selection unit 170 selects the face detection result.

In a case where the distance value acquired from the ranging unit 110 is greater than or equal to the first threshold value and less than the second threshold value, the selection unit 170 refers to the face detection result and determines whether or not the coordinates of the left eye and the coordinates of the right eye are detected by the face detecting unit 160. In a case where the coordinates of the left eye and the coordinates of the right eye are detected by the face detecting unit 160, the selection unit 170 selects the face detection result. In a case where any one of the coordinates of the left eye and the coordinates of the right eye is not detected, the selection unit 170 selects the detection result of the center of gravity.

1.4 Processing Procedure of Tracking Device

Figure 7:
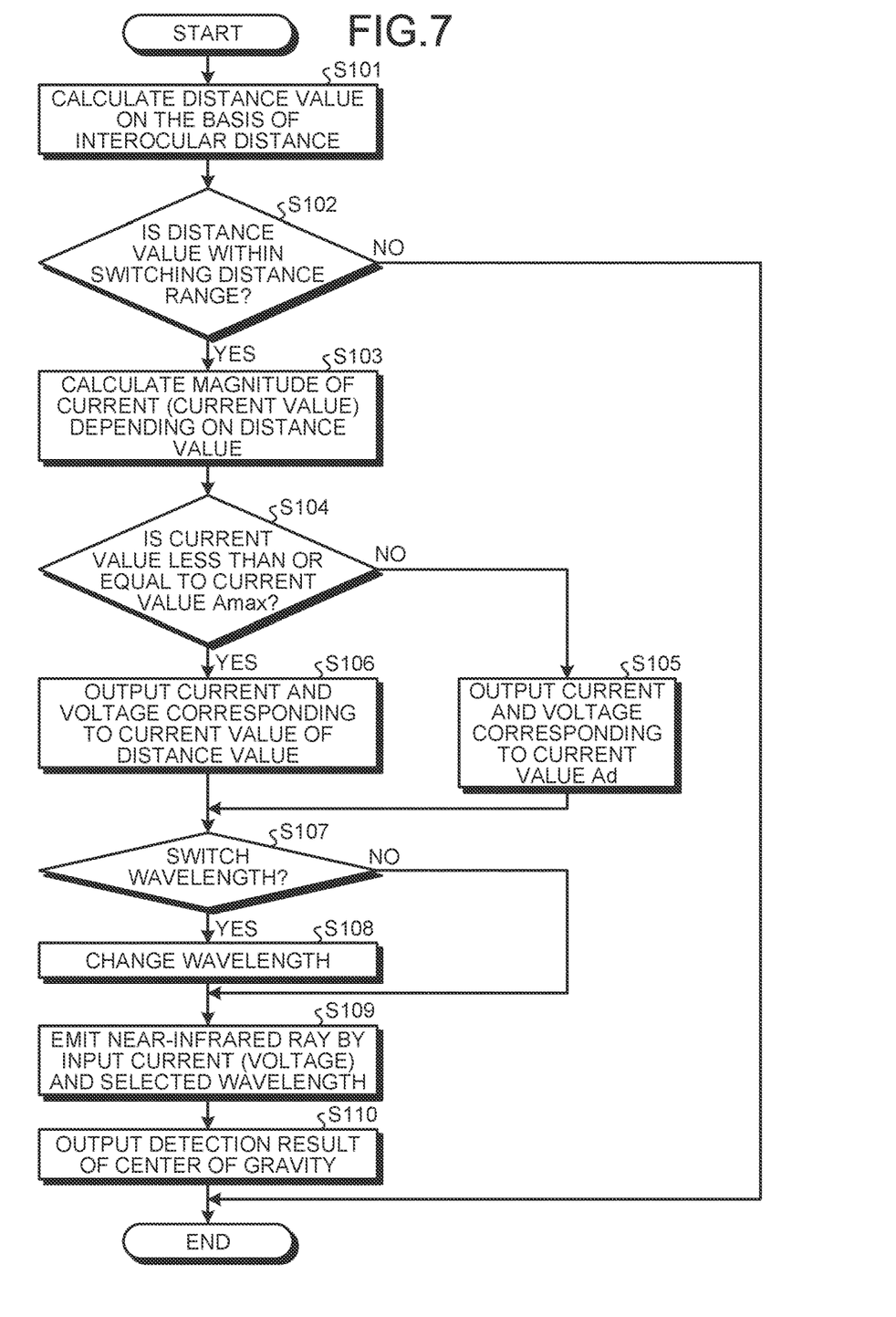
FIG. 7 is a flowchart illustrating a processing procedure of a tracking device of the present embodiment.

Next, a processing procedure of the tracking device 100 of the present embodiment will be described. FIG. 7 is a flowchart illustrating a processing procedure of the tracking device of the present embodiment. In the processing procedure described in FIG. 7, an example of a processing procedure for controlling the light of the near-infrared ray emitting unit 140 in conjunction with the distance value will be described. The ranging unit 110 of the tracking device 100 calculates a distance value on the basis of the interocular distance (step S101).

In a case where the distance value is not within a switching distance range (step S102, No), the light emission controlling unit 120 of the tracking device 100 ends the processing. On the other hand, the light emission controlling unit 120 calculates the magnitude of the current (current value) depending on the distance value.

If the current value is not less than or equal to the current value Amax (step S104, No), the light emission controlling unit 120 outputs a current and a voltage corresponding to the current value Ad to the near-infrared ray emitting unit 140 (step S105) and proceeds to step S107. On the other hand, if the current value is less than or equal to the current value Amax (step S104, Yes), the light emission controlling unit 120 outputs a current and a voltage corresponding to the distance value to the near-infrared ray emitting unit 140 (step S106) and proceeds to step S107.

The wavelength selection unit 140a of the tracking device 100 determines whether or not to switch the wavelength on the basis of the selection result of the wavelength controlling unit 130 (step S107). If the wavelength is switched (step S107, Yes), the wavelength selection unit 140a changes the wavelength (step S108) and proceeds to step S109. On the other hand, if the wavelength is not switched (step S107, No), the wavelength selection unit 140a proceeds to step S109.

The near-infrared ray emitting unit 140 emits a near-infrared ray by the current (voltage) input to the light emission controlling unit 120 and the wavelength selected by the wavelength selection unit 140a (step S109). The center of gravity detecting unit 150a of the tracking device 100 outputs the detection result of the center of gravity to the selection unit 170 (step S110).

1.5 Effects of Tracking Device

Next, effects of the tracking device 100 according to the present embodiment will be described. The tracking device 100 controls the light emission amount of the near-infrared ray emitting unit 140 on the basis of the distance value between the user and the near-infrared ray emitting unit 140 and detects feature points of the user on the basis of the captured image by the image sensor 150. This makes it possible to appropriately track the viewpoint position of the user.

The tracking device 100 increases the emission intensity of the near-infrared ray emitting unit 140 as the distance value increases. This makes it possible to accurately detect the viewpoint position of the user even when the distance from the user is long.

When adjusting the magnitude of the current input to the near-infrared ray emitting unit 140 on the basis of the distance value, the tracking device 100 prevents the magnitude of the current from exceeding the upper limit value. As a result, it is possible to suppress the emission intensity of the near-infrared ray emitting unit 140 from becoming too high and to satisfy the requirements of the photobiological safety standards JIS C 7550 and IEC62471. In addition, it is possible to control so that the user's face is not overexposed by emission of the near-infrared ray.

The tracking device 100 selects the detection result of the center of gravity as the viewpoint position in a case where the distance value is less than the threshold value and selects the face detection result as the viewpoint position in a case where the distance value is greater than or equal to the threshold value. As a result, in a case where the user is nearby, it is possible to use center of gravity information having higher responsiveness. Furthermore, in a case where the user is at a distance, quick and stable viewpoint tracking can be executed by using the face detection result.

2. Hardware Configuration

Figure 8:
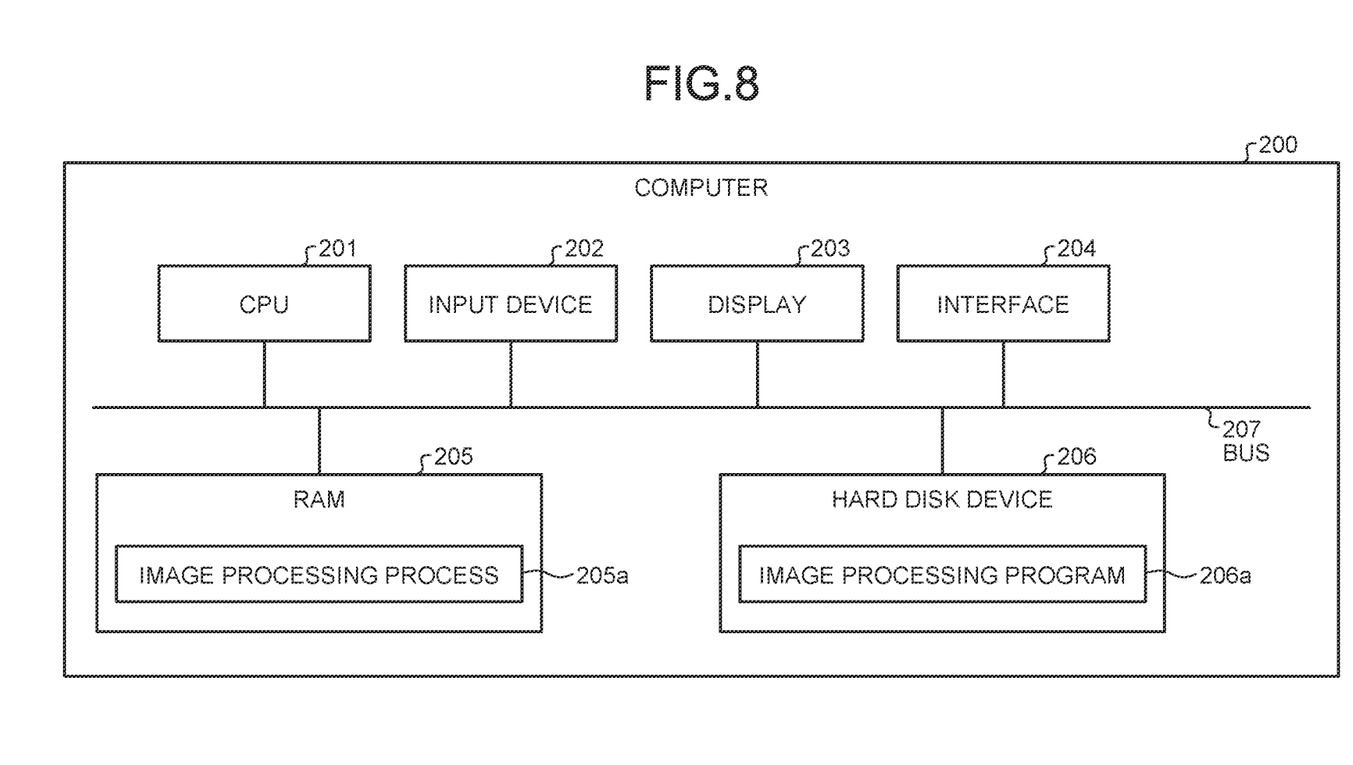
FIG. 8 is a hardware configuration diagram illustrating an example of a computer that implements the functions of the tracking device.

The tracking devices according to the above-described embodiments are implemented by, for example, a computer 200 having a configuration as illustrated in FIG. 8. Hereinafter, the tracking device 100 according to the embodiment will be described as an example. FIG. 8 is a hardware configuration diagram illustrating an example of a computer 200 that implements the functions of the tracking device. The computer 200 includes a CPU 201 that executes various types of arithmetic processing, an input device 202 that receives an input of data from a user, and a display 203. The computer 200 further has an interface 204 for connection with various devices.

The interface 204 is connected to the near-infrared ray emitting device, the camera (image sensor), the parallax image processing unit, and the like.

A hard disk device 206 includes an image processing program 206a. The CPU 201 reads the image processing program 206a and loads the image processing program 206a in a RAM 205. The image processing program 206a functions as an image processing process 205a.

The processing of the image processing process 205a corresponds to the processing of the ranging unit 110, the light emission controlling unit 120, the wavelength controlling unit 130, the wavelength selection unit 140a, the center of gravity detecting unit 150a, the face detecting unit 160, and the selection unit 170 described in FIG. 3.

Note that the image processing program 206a may not necessarily be stored in the hard disk device 206 from the beginning. For example, each program is stored in a "portable physical medium" such as a flexible disk (FD), a CD-ROM, a DVD disc, a magneto-optical disk, or an IC card inserted into the computer 200. And the computer 200 may read and execute the image processing program 206a.

3. Conclusion

An image processing device includes a light emitting unit, a light emission controlling unit, and a detecting unit. The light emitting unit emits a near-infrared ray to a target. The light emission controlling unit controls the light emission amount of the light emitting unit on the basis of a distance value between the target and the light emitting unit. The detecting unit detects feature points on the basis of a captured image of the target irradiated with the near-infrared ray. The detecting unit detects feature points regarding the face of the target on the basis of the captured image. The left eye and the right eye of the target are detected as feature points on the basis of the captured image. This makes it possible to appropriately track the viewpoint position of the user.

The image processing device further includes a center of gravity detecting unit that detects the center of gravity of the pupil or the iris of the target. As a result, even in a case where the feature amounts of the target cannot be detected from the imaging device, it is possible to detect the center of gravity of the pupil or the iris of the target and to track the viewpoint position of the user.

The image processing device includes a ranging unit, and the ranging unit further includes a ranging unit that calculates a distance value on the basis of a distance between feature points included in the captured image. As a result, the distance value can be calculated from the captured image even without using a distance sensor or the like.

The light emission controlling unit of the image processing device specifies the magnitude of the current depending on the distance value and outputs a current of the specified magnitude to the light emitting unit, thereby controlling the light emission amount of the light emitting unit. The light emission controlling unit of the image processing device specifies the magnitude of the current depending on the distance value, corrects the specified magnitude of the current to a magnitude less than the threshold value in a case where the magnitude of the current is larger than a threshold value, and outputs the current of the corrected magnitude to the light emitting unit. As a result, a near-infrared ray having safe intensity can be emitted to the user.

The image processing device includes a selection unit, and the selection unit selects one of a detection result of the detecting unit and a detection result of the center of gravity detecting unit. The selection unit selects one of the detection result of the detecting unit and the detection result of the center of gravity detecting unit on the basis of the detection result of the detecting unit and the detection result of the center of gravity detecting unit. This makes it possible to stably track the viewpoint position of the user at high speed.

The selection unit outputs the detection result that has been selected to a device that generates a stereoscopic image. As a result, a stereoscopic image suitable for the user can be displayed.

The image processing device further includes a wavelength controlling unit, and the wavelength controlling unit controls the wavelength of the near-infrared ray emitted by the light emitting unit on the basis of the detection result of the detecting unit. As a result, it is possible to stably execute processing of detecting the center of gravity of the pupil or the iris of the target.

Note that the effects described herein are merely examples and are not limiting, and other effects may also be achieved.

Note that the present technology can also have the following configurations.

(1)
An image processing device including:
  a light emitting unit that emits a near-infrared ray to a target;
  a light emission controlling unit that controls a light emission amount of the light emitting unit on a basis of a distance value between the target and the light emitting unit; and
  a detecting unit that detects a feature point on a basis of a captured image of the target irradiated with the near-infrared ray.

(2)
The image processing device according to (1), wherein the detecting unit detects a feature point regarding a face of the target on a basis of the captured image.

(3)
The image processing device according to (2), wherein the detecting unit detects a left eye and a right eye of the target as feature points on a basis of the captured image.

(4)
The image processing device according to (3), further including a center of gravity detecting unit that detects a center of gravity of a pupil or an iris of the target.

(5)
The image processing device according to (4), further including a ranging unit that calculates the distance value on a basis of a distance between feature points included in the captured image.

(6)
The image processing device according to (1), wherein the light emission controlling unit controls the light emission amount of the light emitting unit by specifying a magnitude of a current depending on the distance value and outputting a current of the specified magnitude to the light emitting unit.

(7)
The image processing device according to (6), wherein the light emission controlling unit specifies a magnitude of a current depending on the distance value, corrects the specified magnitude of the current to a magnitude less than a threshold value in a case where the magnitude of the current is larger than the threshold value, and outputs a current of the corrected magnitude to the light emitting unit.

(8)
The image processing device according to (5), further including a selection unit that selects one of a detection result of the detecting unit and a detection result of the center of gravity detecting unit on a basis of the distance value.

(9)
The image processing device according to (8), wherein the selection unit selects one of the detection result of the detecting unit and the detection result of the center of gravity detecting unit on a basis of the detection result of the detecting unit and the detection result of the center of gravity detecting unit.

(10)

The image processing device according to any one of (1) to (8), wherein the selection unit outputs the detection result that has been selected to a device that generates a stereoscopic image.

(11)

The image processing device according to any one of (1) to (10), further including a wavelength controlling unit that controls a wavelength of the near-infrared ray emitted by the light emitting unit on a basis of the detection result of the detecting unit.

(12)

An image processing method including:
  by a computer,
  controlling a light emission amount of a light emitting device that emits a near-infrared ray to a target on a basis of a distance value between the target and the light emitting device; and
  detecting a feature point on a basis of a captured image of the target irradiated with the near-infrared ray.

(13)

An image processing program for causing a computer to function as:
  a light emission controlling unit that controls a light emission amount of a light emitting device that emits a near-infrared ray to a target on a basis of a distance value between the target and the light emitting device; and
  a detecting unit that detects a feature point on a basis of a captured image of the target irradiated with the near-infrared ray.

REFERENCE SIGNS LIST

100 TRACKING DEVICE
110 RANGING UNIT
120 LIGHT EMISSION CONTROLLING UNIT
130 WAVELENGTH CONTROLLING UNIT
140 NEAR-INFRARED RAY EMITTING UNIT
140a WAVELENGTH SELECTION UNIT
150 IMAGE SENSOR
150a CENTER OF GRAVITY DETECTING UNIT
160 FACE DETECTING UNIT
170 SELECTION UNIT

The invention claimed is:

1. A tracking device, including:
an infrared (IR) light emitter configured to emit a near-infrared ray;
a camera configured to acquire a visible captured image and an IR captured image corresponding to the emitted near-infrared ray, wherein each of the visible captured image and the IR captured image includes a target; and
circuitry configured to:
  calculate a distance value between the target and the IR light emitter;
  control a light emission amount of the IR light emitter on a basis of the distance value;
  perform first tracking of a viewpoint of the target on a basis of a face frame of the target in the visible captured image in accordance with the calculated distance value larger than a first threshold value; and
  perform, instead of the first tracking, second tracking of the viewpoint of the target in accordance with the calculated distance value smaller than the first threshold value, wherein the second tracking includes detecting a center of gravity of at least one of a pupil or an iris in the IR captured image on the basis of the face frame.

2. The tracking device according to claim 1, wherein the circuitry is configured to control the light emission amount of the IR light emitter by outputting a current corresponding to the calculated distance value to the IR light emitter.

3. The tracking device according to claim 2, wherein
the circuitry is configured to control the light emission amount of the IR light emitter by correcting the current to become less than a second threshold value in a case where a magnitude of the current is larger than the second threshold value, and
the second threshold value corresponds to a photobiological safety standard.

4. The tracking device according to claim 1, wherein the circuitry is further configured to control a wavelength of the near-infrared ray on a basis of a detection result of at least one of the first tracking or the second tracking.

5. The tracking device according to claim 1, wherein the circuitry is further configured to output a detection result of at least one of the first tracking or the second tracking to a stereoscopic display device.

6. A tracking method, including:
emitting, by an infrared (IR) light emitter, a near-infrared ray;
acquiring, by a camera, a visible captured image and an IR captured image corresponding to the emitted near-infrared ray, wherein each of the visible captured image and the IR captured image includes a target;
calculating, by circuitry, a distance value between the target and the IR light emitter;
controlling, by the circuitry, a light emission amount of the IR light emitter on a basis of the distance value;
performing, by the circuitry, first tracking of a viewpoint of the target on a basis of a face frame of the target in the visible captured image in accordance with the calculated distance value larger than a first threshold value; and
performing, by the circuitry, instead of the first tracking, second tracking of the viewpoint of the target in accordance with the calculated distance value smaller than the first threshold value, wherein the second tracking includes detecting a center of gravity of at least one of a pupil or an iris in the IR captured image on the basis of the face frame.

7. A non-transitory computer-readable medium having stored thereon, computer-executable instructions which, when executed by a tracking device, cause the tracking device to execute operations, the operations comprising:
emitting, by an infrared (IR) light emitter of the tracking device, a near-infrared ray;
acquiring, by a camera of the tracking device, a visible captured image and an IR captured image corresponding to the emitted near-infrared ray, wherein each of the visible captured image and the IR captured image includes a target;
calculating, by circuitry of the tracking device, a distance value between the target and the IR light emitter;
controlling, by the circuitry, a light emission amount of the IR light emitter on a basis of the distance value;
performing, by the circuitry, first tracking of a viewpoint of the target on a basis of a face frame of the target in the visible captured image in accordance with the calculated distance value larger than a first threshold value; and performing, by the circuitry, instead of the first tracking, second tracking of the viewpoint of the target in accordance with the calculated distance value smaller than the first threshold value, wherein the second tracking includes detecting a center of gravity of at least one of a pupil or an iris in the IR captured image on the basis of the face frame.

\* \* \* \* \*